United States Patent [19]

Taylor et al.

[11] 4,404,490
[45] Sep. 13, 1983

[54] POWER GENERATION FROM WAVES NEAR THE SURFACE OF BODIES OF WATER

[76] Inventors: George W. Taylor, 305 Dodds La., Princeton, N.J. 08540; Joseph R. Burns, 3 Queens La., Pennington, N.J. 08534

[21] Appl. No.: 170,858

[22] Filed: Jul. 21, 1980

[51] Int. Cl.³ ............................................. F03B 13/12
[52] U.S. Cl. ...................................... 310/339; 310/337; 310/800; 73/170 A; 73/DIG. 4; 290/42; 290/53
[58] Field of Search ................... 290/42, 53; 310/328, 310/339, 800, 323, 337; 73/861.18, 861.24, 170 A, DIG. 4; 331/156

[56] References Cited

U.S. PATENT DOCUMENTS

| | | | |
|---|---|---|---|
| 3,552,204 | 1/1971 | Tourmen | 73/170 A |
| 3,867,839 | 2/1975 | Herzl | 73/861.24 |
| 4,110,630 | 8/1978 | Hendel | 290/42 |
| 4,166,229 | 8/1979 | De Reggi et al. | 310/337 |
| 4,317,047 | 2/1982 | de Almada | 290/53 |

FOREIGN PATENT DOCUMENTS

WO80/01674  8/1980  PCT Int'l Appl. ................. 290/53

Primary Examiner—J. D. Miller
Assistant Examiner—D. L. Rebsch

[57] ABSTRACT

For the purpose of converting the mechanical energy of surface waves on bodies of water, a power generating piezoelectric structure (10) is provided comprising piezoelectric material members, preferably in the form of one or a laminate of sheets (14) of such material, each sheet having an electrode (24) on opposite surfaces thereof. Each pair of electrodes and the piezoelectric material therebetween define a power generating element, each of which is preferably dimensioned, relative to the wave lengths of selected waves on the body of water in which the generator is to be used, for increasing the efficiency of power conversion. A support means (12) is provided for maintaining the structure in a preselected position within and below the surface of the water. Preferably, the piezoelectric generating elements are flexible and are supported in such manner to allow flexure thereof in response to movement of the surrounding water. In certain embodiments, the elements are designed to enter into mechanical resonance in response to the passage of waves thereover, such flexure and/or resonance increasing the mechanical coupling efficiency between the waves and the elements.

23 Claims, 7 Drawing Figures

POWER GENERATION FROM WAVES NEAR THE SURFACE OF BODIES OF WATER

BACKGROUND OF THE INVENTION

This invention relates to the generation of electrical power from waves on the surface of bodies of water, and particularly to the conversion of the mechanical energy of such waves to electrical energy by means of piezoelectric materials.

The use of piezoelectric materials to convert mechanical energy directly to electrical energy is, of course, well known. However, to our knowledge, prior art piezoelectric devices have been used merely as sensors of various forms of mechanical energy, and have not been thought of in connection with the generation of relatively large amounts of electrical power. However, in accordance with our invention, substantial amounts of electrical energy can be derived at commercially attractive costs by utilizing the enormous amount of mechanical energy present in the surface waves of bodies of water, particularly the oceans.

SUMMARY OF THE INVENTION

A power generating piezoelectric structure comprises a piezoelectric material member, preferably in the form of one or a laminate of sheets of the material, each sheet having an electrode on opposite surfaces thereof. Each pair of electrodes and the piezoelectric material therebetween define a power generating element. In a preferred embodiment, a plurality of power generating elements are used, each element being dimensioned, as described hereinafter, relative to the wavelengths of selected waves on the body of water in which the system is to be used for increasing the efficiency of power conversion. A support means is provided for maintaining the structure in a preselected position within and below the surface of the water. Preferably, the piezoelectric generating elements are flexible and are supported in such manner to allow flexure thereof in response to movement of the surrounding water. In certain embodiments, the elements are designed to enter into mechanical resonance in response to the passage of waves thereover, such flexure and/or resonance increasing the mechanical coupling efficiency between the waves and the elements.

DETAILED DESCRIPTION OF THE INVENTION

Figure 1:
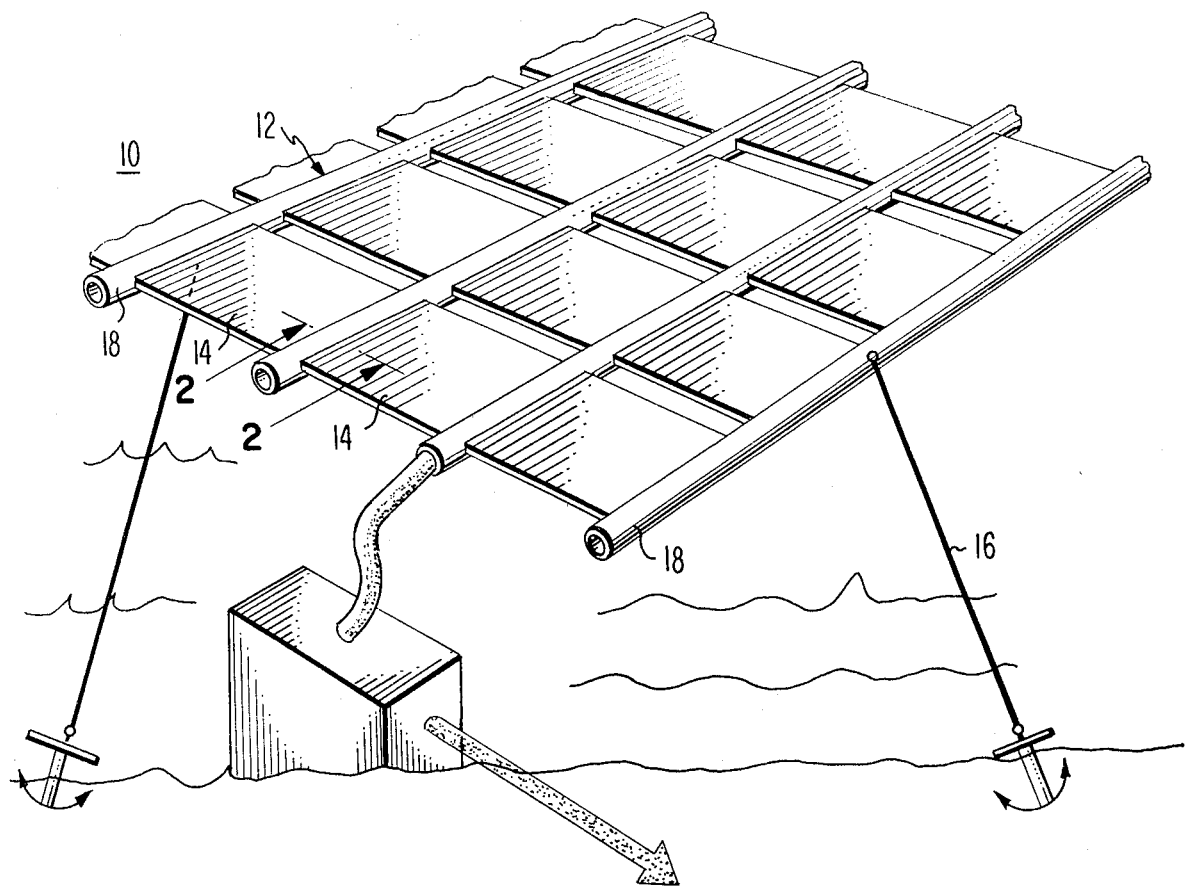
FIG. 1 is a schematic view, in perspective, of one embodiment of a power generating system according to the invention.

A general description of a power generating system in accordance with one embodiment of the invention is first provided. With reference to FIG. 1, a piezoelectric power generating system 10 is shown including a buoyant support structure 12, sheets or laminate of sheets 14 of piezoelectric material supported by the structure 12, and anchoring cables 16 for maintaining the system in preselected position within a body of water.

The support structure 12 has a frame-like configuration, comprising individual tubular members 18 connected together to form a grid work of cells, each cell containing a piezoelectric material member, preferably, in this embodiment, in the form of a sheet or laminate of sheets. The sheets, or laminates, are secured along the edges thereof to the tubular members. Cross members, not shown, can be used to maintain the spacing between the tubular members 18.

Figure 2:
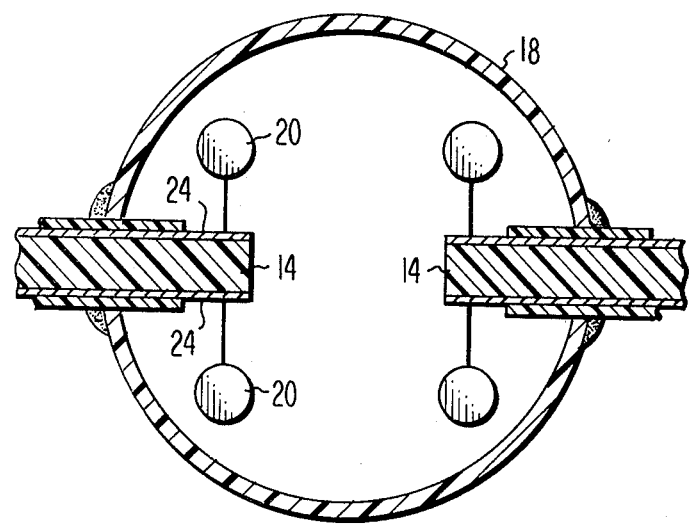
FIG. 2 is a cross sectional view on an enlarged scale, taken along line 2—2 of FIG. 1.

The tubular members 18 provide buoyancy for the system, and to this end, as shown in greater detail in FIG. 2, the tubular members are hollow, are filled with air, and are hermetically sealed against the surrounding water. Alternately, the frame members can be more or less solid but of low density material for buoyancy. In either case, it is convenient to also thread power cables 20 through the tubular members, the power cables serving to collect the generated electrical energy, as described hereinafter, while at the same time being protected from the surrounding water by the members. Preferably, the edges of the piezoelectric members extend into the tubular members, through hermetic seals, and electrical contacting to the piezoelectric members is made within the tubular members.

The anchoring means can comprise conventional systems.

Each piezoelectric material member, which is described in greater detail hereinafter, comprises a sheet of piezoelectric material, e.g., the known plastic polymer polyvinylidene fluoride (PVF$_z$), having an electrode 24 on opposite surfaces thereof.

In operation, the structure is disposed just beneath the surface of a body of water, and, as the waves pass thereover, the alternate increases and decreases in water pressure caused by the waves alternately cause compression and decompression of the piezoelectric material. The structure 10 is preferably disposed as close to the surface as is possible without exposing the structure to possible damage caused by surface conditions. Fortunately, water pressure variations caused by passing waves of long wavelength, as in the ocean, fall off in intensity relatively slowly with depth, hence a safe depth can be selected without great loss of energy transmitted from the surface waves. The alternate compressing and decompressing of the piezoelectric material results in the generation of an a.c. voltage in the piezoelectric material sheets between the two electrodes 24 on the opposite sides thereof. The frequency of the output voltage is quite low, being the same as that of the overpassing waves, e.g., about 0.1 H$_z$ for ocean waves. The voltage generated by each sheet is a function of the physical characteristics of the piezoelectric material and the thickness of the sheet. The power output of the system is directly proportional to the volume of piezoelectric material. Thus, for example, a laminate consisting of ten sheets of piezoelectric material has an energy generating capacity generally equivalent to ten times that of a single sheet. In the embodiment shown in FIG. 1, each cell is an individual power generating element, the power from the various elements being collected by the power cables 20.

Because the power output is also a function of the surface area of the elements, each element is preferably as large as practical, subject, however, to various hereinafter described considerations. The large size of the piezoelectric elements, for the purpose of extracting power from surface waves, is one basis for distinguishing the present invention from prior known uses of piezoelectric members within bodies of water, e.g., hydrophones for detecting audio signals. For example, practical power generating systems according to this invention comprise piezoelectric elements having areas of at least one square meter. To our knowledge, this is far greater than the area of the piezoelectric elements in prior known devices which are used for entirely different purposes.

To prevent electrical shorting of the various electrodes by the surrounding water, and to protect the electrodes against corrosion, those electrodes which are not otherwise protected, e.g., as by being embedded within a laminate structure, are coated with an insulating-protective material, e.g., a varnish or epoxy-like material. Also, the insulating-protective material can comprise an extra layer or layers of the piezo-electric material itself on the outside surfaces of the piezoelectric material elements, the outer, exposed surfaces of the extra layers containing no electrodes.

Within the tubular members 14, the various electrodes are exposed, and known means, such as spring biased contacts, are used to electrically contact the exposed electrodes.

Certain aspects of the power generating system are now discussed in greater detail.

As previously noted, the system generates a low frequency a.c. voltage in response to the passage of surface waves thereover, a voltage of one polarity being generated in response to an increasing water pressure, and a voltage of the opposite polarity being generated in response to a decreasing pressure. Along the direction of travel of the surface waves, the water pressure varies from point to point at any given instant. Thus, in a power generating element beneath a wave, the water pressure along the element in the direction of travel of the wave similarly varies, and the voltage generated at each point along the wave direction also varies. The effect of this is to give rise to some degree of cancellation of the generated voltage to the extent that voltages of opposite polarity are being generated within the element at any given time. For an element having an length in the direction of travel of the waves of, for example, one wavelength, full cancellation occurs, and the voltage and power output of such element is zero. Any cancellation tends to reduce the power output of the elements and is undesirable.

To minimize such cancellation, the piezoelectric material elements should not extend significantly along the direction of wave travel. Ideally, the elements should be as short as possible in such direction. However, because the power generated by an element, e.g., a sheet 14, is a function of its area, it can be shown that, depending upon the configuration of the element, there is an optimum dimension in the direction of wave travel owing to the facts that power output increases linearly with area (the area being a function of such dimension), whereas the reduction in power output caused by cancellation effects decreases (according to a sine function) with such dimension.

Thus, for a given wavelength, we have determined in a first order analysis that, for rectilinear generating elements such as shown in FIG. 1, the optimum element dimension in the direction of travel of the waves is 0.37 times the wavelength. For circular generating elements, described hereinafter, the optimum diameter of the elements is 0.58 times the wavelength.

In terms of operability, the various optimum dimensions, depending upon the shape of the generating elements, are not critical because power is still generated using other dimensions, or different wavelength waves, but less efficiently. Also, because the optimum values have been determined mathematically, they may not be exactly correct owing to unforeseen factors. Nonetheless, it is clear that cancellation does occur in systems of the type described, and such cancellation effect is preferably considered in the design of the system.

In one technique, for example, a study is made to determine the pattern of waves to be expected over a period of time, and the dimensions of the elements are selected to most efficiently couple with the expected wave pattern. Thus, the selected dimensions may not be 'optimum' for any particular, or even for any prevalent waves, but are the best match over the selected time period.

In the embodiment shown in FIG. 1, the piezoelectric sheets are rectangular in shape, the structure 10 being oriented in the water such that the short dimension of the sheets is in to the direction of wave travel. If necessary, known means can be provided for detecting the wave direction and reorienting the structure 10 as needed.

An alternate arrangement to avoid such cancellation effect is to use a plurality of individual, electrically isolated and properly dimensioned generator elements of piezoelectric material in each cell of the system.

Figure 3:
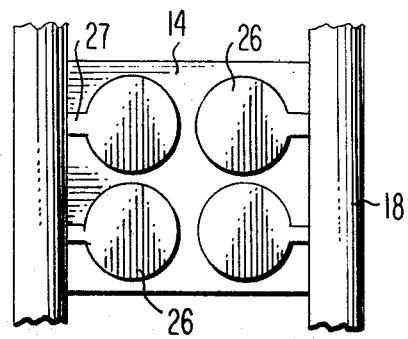

In one such arrangement, for example, illustrated in FIG. 3, each sheet 14 of piezoelectric material is provided with a plurality of spaced apart, circular electrodes 26 on opposite sides thereof, the electrodes being disposed in vertically aligned pairs of electrodes. Each electrode pair and the sheet material therebetween define an individual power generating element.

The power from each element is collected via extensions 27 of each electrode 26 along the sheet to the power cables 20 within the tubular members 18.

To avoid cancellation effects, the diameter of each circular electrode 26 is the "optimum" dimension, i.e., the aforesaid 0.58 times the wavelength of the passing waves.

Figure 4:
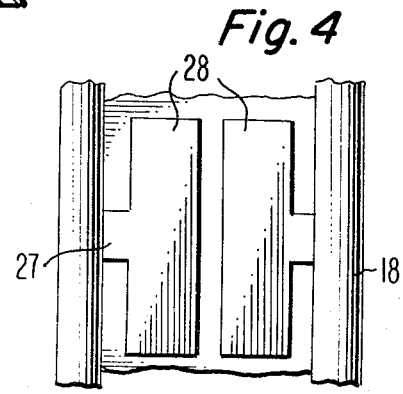
FIGS. 3 and 4 are plan views showing different electrode configurations used with the piezoelectric sheets.

FIG. 4 shows an embodiment in which the individual generating elements comprise spaced apart rectangular elements 28.

For grid cells of given size, the total generating area of the rectangular elements 28 of FIG. 4 is greater than that of the circular elements shown in FIG. 3. However, because the circular elements have the "optimum" dimension in all directions, the power output of a circular element system is unaffected by the direction of wave travel. Thus, under certain circumstances, the average power output of the circular element arrangement is greater than that of the rectangular element arrangement.

The embodiments shown in FIGS. 3 and 4 can use either individual sheets or laminates of sheets, the electrodes on the various sheets being in vertical registration with each other.

Figure 5:
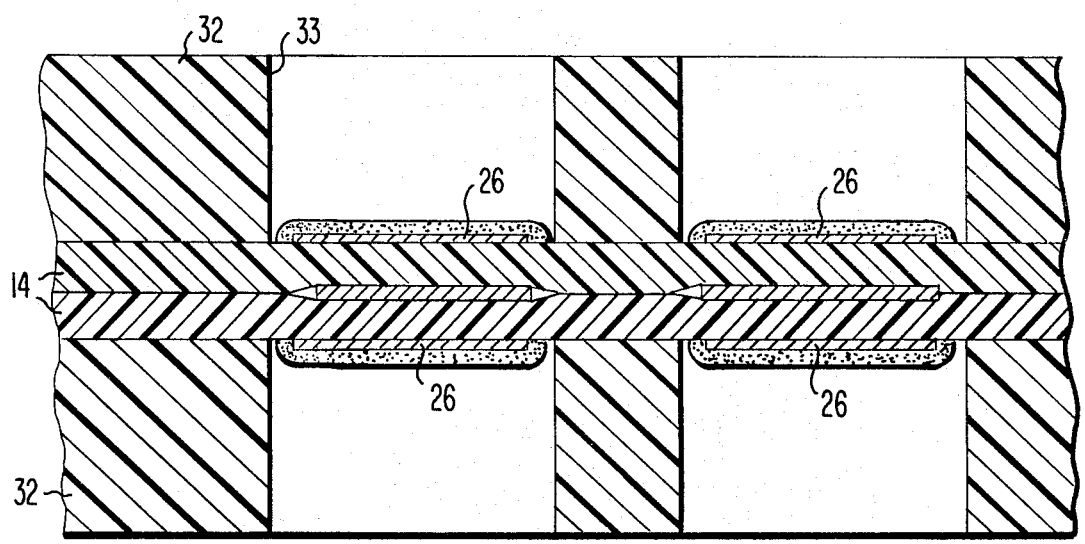
FIG. 5 is a view in cross-section showing a further arrangement for supporting the piezoelectric sheets.

In another embodiment, shown in FIG. 5, the electrode segmented sheet or sheets of the FIGS. 3 or 4 embodiments are clamped between a pair of relatively rigid and relatively thick (e.g., 100 mils) sheets or plates 32 of an inert material, e.g., polyethylene, having a number of pairs of vertically registered openings 33 therethrough, the shape and size of the openings corresponding to the electrodes 26 (or 28) on the sheets 14. The electrodes of the various generating elements are disposed in registry with these openings, the walls of the openings thus defining physical boundaries for each generator on the sheets 14. The purpose of this is described hereinafter. The plates 32 are rigidly attached to the support members 18 (not shown).

In this embodiment, a laminate comprising two sheets 14 is shown, each sheet extending entirely across each cell of the support structure. Alternately, the sheets 14 are not continuous between the plates 32, but comprise merely circular or rectangular segments stretched across the openings 33 and having edge portions attached to or clamped between the plates near the openings.

Figure 6:
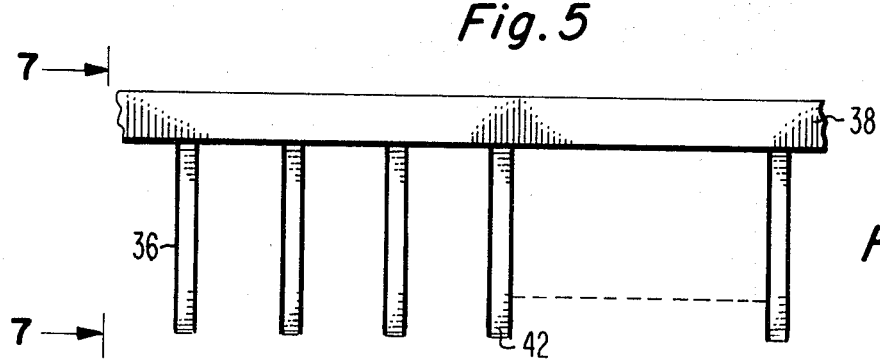
FIG. 6 is an elevational view of an array of power generating elements according to another embodiment of the invention.
Figure 7:
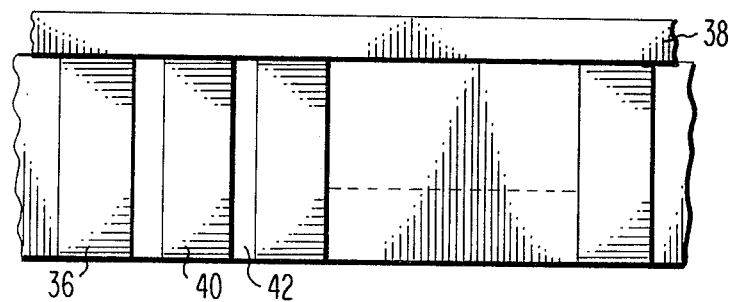
FIG. 7 is an elevational view along the line 7—7 of FIG. 6.

In still another embodiment shown in FIGS. 6 and 7, the piezoelectric elements 36, such as those previously described, are arranged to hang vertically from a suitable support structure such as a raft or, preferably, a platform 38 submerged at a fixed depth.

By disposing the plane of the generator elements perpendicular to the direction of travel of the waves, cancellation effects are avoided. However, because even small variations from such perpendicular relationship give rise to a pressure variation profile along the horizontal length of the elements, cancellation effects would then be present. To avoid this problem, the power generating elements 36 are arranged in vertical strips, the horizontal dimension or width of each element being based upon the optimum dimension to avoid cancellation effects, that is, 0.37 times the wavelengths of the passing waves for the rectilinear elements shown. Again, as previously noted, the exact width used is not critical.

In this embodiment, as in other embodiments previously described, each element 36 comprises a pair of oppositely disposed electrodes 40 and the portion of a piezoelectric material sheet 42 therebetween. Power collecting means are disposed within the platform 38.

Because the amplitude of wave induced pressure variations does fall off with depth, the length of the elements in the vertical direction is preferably relatively small, e.g., 0.1 of the wavelengths of the passing waves. Large overall area for the system is conveniently obtained by using element supporting structures, e.g., the piezoelectric material sheets or laminates thereof, as previously described, having their horizontal dimension as long as is practical.

A further effect of the movement of the waves across the power generating system is that the phase relationships among the voltages generated by various ones or groups of power generating elements varies from moment to moment, and such variable phase relationships must be accounted for in the collection of power from the system. One simple means to accomplish this is to first convert the a.c. power generated by the various elements to d.c. power using, for example, a full wave rectifier for each element or group of elements of the system. Then, the d.c. power output from all the rectifiers can be combined without regard to the phase relations of the generating elements.

In the embodiments shown herein, for example, a number of full wave rectifiers, preferably of known semiconductor type, are disposed within the tubular members 18 or the platform 38, and the power output of each generator element of group of elements is connected to a different one of the rectifiers. The d.c. output of all the rectifiers are connected, in proper polarity relation, to the power cables 20 passing through the members 18. The various power cables 20 of the grid are connected together, in parallel, to collect all the power generated by the system 10 and convey it to a shore station, for example, by an underwater power transmission cable, where it can be further processed and distributed as desired.

By "group" of elements is meant a number of elements which generate, because of the spatial relationship of the elements, in phase voltages. For example, in a laminate arrangement such as shown in FIG. 5, each set of vertically aligned generator elements is exposed to essentially the same water pressure profile, hence the voltages generated in each element of the set are in phase identical relation.

A further factor of great importance to the amount of power generated by the herein described systems is the efficiency of coupling of the mechanical energy contained in the surface waves to the piezoelectric power generating elements. One means for increasing such coupling efficiency is now discussed.

Experiments have shown that the mechanical coupling efficiency and the power output of a piezoelectric generator are increased by allowing the piezoelectric material to move, e.g., flex and twist (in addition to the alternate compressions and decompressions), in response to the movements of the surrounding water. Thus, in general, piezoelectric power generating systems optimally comprise flexible piezoelectric materials, such as the plastic sheets described herein, supported in such manner, as herein described, allowing flexure of the materials in response to water movement.

One means to obtain relatively high, and perhaps even maximum coupling efficiency, is to design the system to cause the piezoelectric elements to enter into mechanical resonance in response to the passing waves. Such resonance gives rise to large amplitude oscillatory movements of the piezoelectric material, such movements increasing the interaction, and thus the energy transfer, between the waves and the generator elements.

In general, the design of mechanical systems to resonate at preselected frequencies is well known. For the configurations shown in FIGS. 1-4, in which each piezoelectric material sheet or laminate is secured about its periphery to the supporting frame members, the resonance frequency characteristics of the piezoelectric material sheets are a known function of such factors as the sheet dimensions, mass, and sheet tension.

These same factors govern the resonant frequency of the arrangements illustrated in FIG. 5 except that, owing to the clamping of the sheets 14 between the plates 32, the resonant frequency of each set of vertically aligned generating elements is determined by the dimensions of the openings 33 across which the sheets 14 are stretched.

For example, in an arrangement such as shown in FIG. 5, using circular electrodes, a natural resonant frequency of about 0.1 $H_z$ is obtained with electrodes having a diameter of 54 meters, a sheet tension of 50 pounds, and with sheets having a specific gravity of 1.8. Each sheet 14 has a thickness of 30 microns, but for such large diameter elements, the thickness of the sheets and the electrodes therein, and even the number of sheets, has relatively little affect on the resonant frequency.

It is noted that typical ocean waves have a wavelength of about 100 meters. Thus, the electrode diameter of 54 meters, in this embodiment, to obtain a natural resonant frequency corresponding to the frequency of the waves, is quite close to the optimum diameter, of 58 meters, to maximize power output in view of cancellation effects.

As is the case with the optimum dimension for minimizing cancellation effects, the design of the system to achieve a particular resonant frequency is not critical owing to the likelihood of variations in wave conditions. Also, the various elements can be designed to have a relatively wide bandwith around their resonant frequency to further accommodate waves of varying frequencies.

The selection of the piezoelectric material is now discussed.

In terms of mere operation, i.e., the generation of some quantity of electrical power, practically any known piezoelectric material can be used. Some, obviously, are far more suitable than others, and, as previously noted, the preferred piezoelectric material at this time is the known plastic polymer polyvinylidene fluoride ($PVF_2$). Advantages of this material are that it has characteristic plastic material properties such as inertness, strength and flexibility. Also, it is commercially available in large area metal coated (electroded) sheet form.

Another useful material is a ceramic organic composite manufactured by the Honeywell Corporation. This material consists of fine grain PZT (lead zirconate titanate) particles embedded in a silicone rubber sheet.

For increasing the power generating capacity of the systems, the piezoelectric sheets are preferably arranged in layers to form a laminate, each piezoelectric sheet having one or more pairs of oppositely disposed electrodes on the surfaces thereof. Because, as previously noted, the voltages generated by each set of aligned generator elements of the laminate are in phase identical relation, the voltages generated by the elements of each set can be added in series. The electrodes between the sheets provide electrical contact between the elements, the various sheets preferably being bonded together by the electrodes themselves which can comprise electrically conductive adhesives, e.g., a silver paste or a known conductive epoxy.

In one embodiment, for example, the laminate comprises 10 sheets of $PVF_2$ material, each sheet having a thickness of 30 mircons, with the electrode-adhesive layers therebetween being 5 mils thick. The reason multiple layer structures are used, rather than a single thick layer of the piezoelectric material, is the difficulty of manufacturing thick sheets.

In one commercially available form, the metal electrodes are of aluminum. Other metal can be used, particularly tin, which is malleable and thus less likely to crack.

As previously noted, cancellation effects follow a sine function; more particularly, for a given dimension transverse to the direction of wave movement along the generator element, the generator element voltage is a function of the relationship $$\frac{\sin \pi \frac{L}{\lambda}}{\pi \frac{L}{\lambda}}$$

where $L$ = the element dimension in the direction of the waves therealong, and $\lambda$ = the wavelength of the waves.

Thus, the voltage goes to zero for L an integral number of wavelengths, and falls off with increasing values of $L/\lambda$.

What is claimed is:

1. The use of a piezoelectric material member for converting the mechanical energy of the surface waves of a body of water to electrical energy, said use comprising disposing said member beneath the surface of the body of water for directly absorbing pressure variations caused by the surface waves, said member including electrodes thereon between which an alternating voltage is generated in response to said pressure variations, the area of each of said electrodes being in excess of one square meter, means for preventing shorting of the electrodes by the surrounding water, and collecting, by means responsive to the alternating voltage at a frequency of said waves, the power generated by said member.

2. The use according to claim 1 including the use of two of said members in spaced apart relation, and the use of means for collecting within a common bus, and in phase additive relationship the power generated by each of said members.

3. The use according to claim 2 in which said power collecting comprises converting the alternating voltage generated by each of said members to a direct current voltage.

4. The use according to claim 1 including supporting said member in a manner allowing flexing thereof in direct response to the passage of waves thereover.

5. The use according to claim 1 including disposing the member in preselected orientation within said body of water with respect to the direction of travel of selected ones of said waves, one of the dimensions of said member being an optimum dimension for maximizing the power output of said member, said dimension being a compromise between the requirements of the use of a large such dimension for providing a large area member and the use of a small such dimension to minimize power cancellation effects caused by the generation of different phase voltages in said member along said dimension.

6. The use of a piezoelectric material member for converting the mechanical energy of the surface waves of a body of water to electrical energy, said use comprising disposing said member beneath the surface of the body of water for directly absorbing pressure variations caused by surface waves and in preselected orientation with respect to the direction of travel of selected ones of the waves, one of the dimensions of said member being an optimum dimension for maximizing the power output of said member, said dimension being a compromise between the requirements of the use of a large such dimension for providing a large area member and the use of a small such dimension to minimize power cancellation effects caused by the generation of different phase voltages in said member along said dimension; said member including electrodes thereon between which an alternating voltage is generated in response to said pressure variations, and including means for preventing shorting of the electrodes by the surrounding water, and collecting the electrical power generated by said member in response to the passage of surface waves thereby.

7. The use according to claim 6 including the use of two of said members in spaced apart relation, and the use of means for collecting within a common bus and in phase additive relationship the power generated by each of said members.

8. The use according to claim 6 including supporting said member in a manner allowing flexing thereof in direct response to the passage of waves thereover.

9. A system for converting the mechanical energy of surface waves of a body of water to electrical energy comprising a plurality of piezoelectric elements, each element including a pair of electrodes between which an a.c. voltage is generated, means for insulating said electrodes of each said elements against shorting together by the surrounding medium, means for maintaining said elements in spaced apart relation beneath the surface of the body of water for directly absorbing pressure variations caused by surface waves, and means for interconnecting said elements for collecting, in additive phase relationship, the electrical energy generated by said members in response to said pressure variations.

10. A system according to claim 9 designed for maximum efficiency of power conversion when waves of a preselected wavelength are present, said elements having a circular configuration, the diameter thereof being about 0.58 times said preselected wavelength.

11. A system according to claim 9 in which said elements are designed to flex in direct response to the passage of the waves.

12. A system according to claim 9 in which each of said elements comprises a sheet of piezoelectric material having an electrode on opposite surfaces thereof.

13. A system according to claim 12 including a pair of rigid members between which at least one of said sheets is clamped, one of said members having an aperture therethrough for directly coupling one of the electrodes on said sheet to said pressure variations.

14. A system according to claim 13 in which said one sheet is rigidly clamped between said members along the edge of said aperture thereby imparting a drum-like characteristic to the portion of said sheet exposed through said aperture, which portion is dimensioned to enter into mechanical resonance in response to the passage of waves of preselected wavelength.

15. A system according to either of claims 11 or 12 in which said elements are adapted to enter into mechanical resonance in direct response to the passage of waves of selected frequency.

16. A system according to claim 12 in which a plurality of said sheets are arranged in a laminate structure providing a plurality of said elements.

17. A system according to claim 9 in which each of said elements is adapted to be maintained in said body of water in preselected orientation with respect to the direction of travel of selected ones of the passing waves, one of the dimensions of said elements being an optimum dimension for maximizing the power output of said elements, said dimension being a compromise between the requirements of the use of a large such dimension for providing large area elements and the use of a small such dimension to minimize power cancellation effects caused by the generation of different phase voltages in said elements along said dimension.

18. A system according to claim 10 including means for disposing said elements in horizontal orientation within said body of water.

19. A system according to claim 17 in which said elements have a rectilinear configuration, said optimum dimension is about 0.37 times the wavelength of said selected waves.

20. A system according to claim 19 including means for disposing said elements in vertical orientation within said body of water.

21. A system according to claim 9 in which said piezoelectric elements comprise a sheet of piezoelectric material including a plurality of spaced apart electrode pairs, each pair comprising oppositely disposed electrodes on opposite surfaces of said sheet.

22. A system according to claim 21 comprising a laminate of sheets each having electrode pairs such as specified in claim 21, each electrode pair of one of said sheets being in registry with a corresponding electrode pair of another one of said sheets.

23. A system according to claim 13 including a laminate of piezoelectric sheets clamped between said members, each sheet having thereon a pair of oppositely disposed electrodes on opposite surfaces of the sheet, the electrode pair of each sheet being in registry with the aperture through said one member.

* * * * *